United States Patent
Badoiu

(10) Patent No.: US 8,898,173 B1
(45) Date of Patent: Nov. 25, 2014

(54) RANKING LOCATION SEARCH RESULTS BASED ON MULTIPLE DISTANCE MEASURES

(75) Inventor: Mihai Badoiu, New York, NY (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 12/780,763

(22) Filed: May 14, 2010

(51) Int. Cl.
 *G06F 17/30* (2006.01)

(52) U.S. Cl.
 CPC .................................. *G06F 17/3087* (2013.01)
 USPC ........................................................ 707/748

(58) Field of Classification Search
 CPC .................................................... G06F 17/3087
 USPC ............................ 707/748, E17.018, E17.058
 See application file for complete search history.

(56) References Cited

U.S. PATENT DOCUMENTS

| | | | | |
|---|---|---|---|---|
| 6,892,371 | B1 * | 5/2005 | Teig et al. | 716/129 |
| 2005/0065916 | A1 | 3/2005 | Ge et al. | |
| 2005/0262062 | A1 * | 11/2005 | Xia | 707/3 |
| 2006/0149734 | A1 | 7/2006 | Egnor et al. | |
| 2006/0149774 | A1 * | 7/2006 | Egnor | 707/102 |
| 2006/0149800 | A1 | 7/2006 | Egnor et al. | |
| 2006/0271531 | A1 | 11/2006 | O'Clair et al. | |
| 2007/0135993 | A1 * | 6/2007 | Riise et al. | 701/207 |
| 2007/0218900 | A1 | 9/2007 | Abhyanker | |
| 2007/0276810 | A1 | 11/2007 | Rosen | |
| 2007/0288437 | A1 | 12/2007 | Xia | |
| 2008/0015928 | A1 | 1/2008 | Chandra | |
| 2008/0154888 | A1 * | 6/2008 | Buron et al. | 707/5 |
| 2008/0243821 | A1 | 10/2008 | Delli et al. | |
| 2009/0132469 | A1 * | 5/2009 | White et al. | 707/2 |
| 2010/0305851 | A1 * | 12/2010 | Meyer et al. | 701/208 |

FOREIGN PATENT DOCUMENTS

WO WO 2006/130463 A3 12/2006

* cited by examiner

*Primary Examiner* — Shiow-Jy Fan
(74) *Attorney, Agent, or Firm* — Bracewell & Giuliani LLP

(57) ABSTRACT

Methods, systems, and apparatus, including computer programs encoded on a computer storage medium, for calculating a location relevance score for search results is disclosed. In one aspect, a location relevance score is calculated for each search result based on three distances to a physical address associated with the search result. The first distance is measured from a polygon approximating the boundary of a specified region of interest. The second distance is measured from a combined area associated with the associated zip codes of the specified region of interest. The third distance is measured from a central location determined according to criteria independent of geometry of the specified region of interest. The search results are ranked according to their associated location relevance scores.

21 Claims, 7 Drawing Sheets

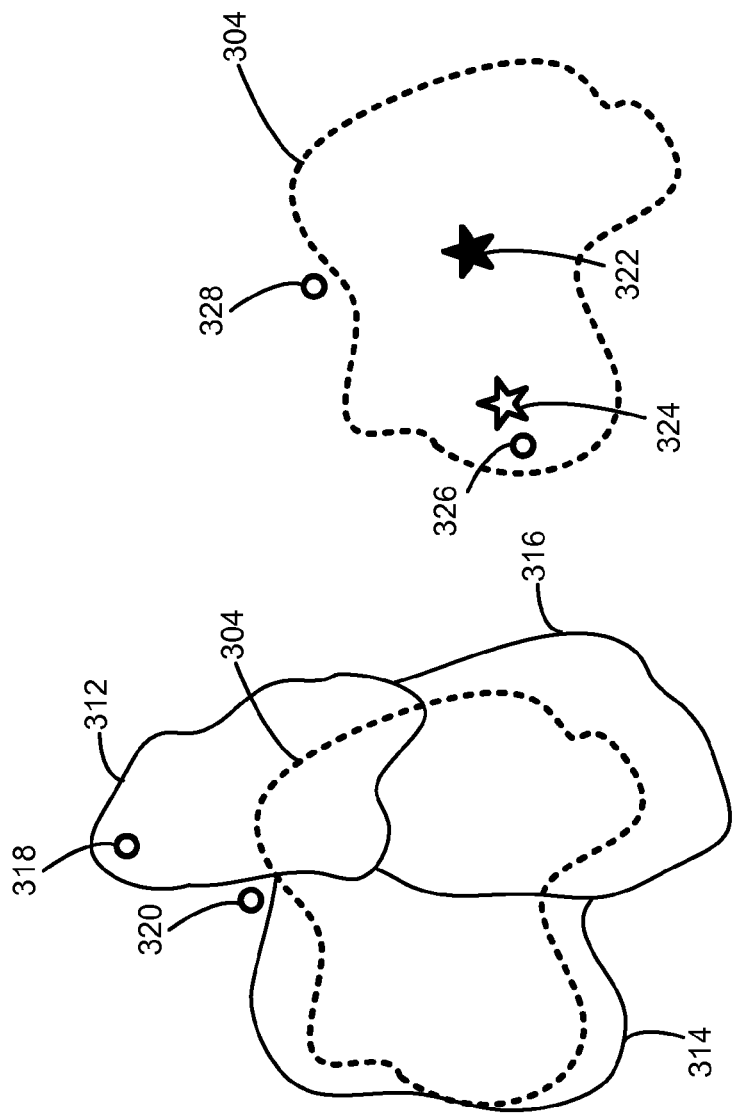
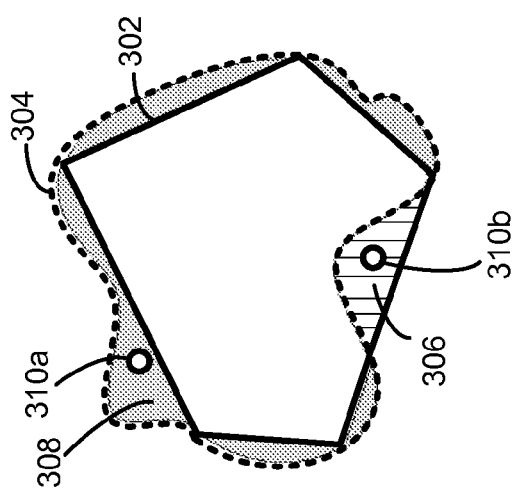
FIG. 3C
FIG. 3B
FIG. 3A

RANKING LOCATION SEARCH RESULTS BASED ON MULTIPLE DISTANCE MEASURES

BACKGROUND

This specification relates to information retrieval.

Many search systems allow users to enter search queries for entities (e.g., government agencies, schools, businesses, and places of interests) and the entities' associated locations. Generally, the user enters one or more search terms to express his or her information needs and also specifies a geographic area for which search results are desired. The search systems base the determination of the user's interest on the search terms and the geographic limitation the user has entered and return search results that list entities (e.g., listings of businesses) that have locations at or near the specified geographic area.

Some search systems rank search results based on how well the search results match the search terms, geographic limitations and other search limitations specified in the search queries. In some search systems, each candidate search result is scored based at least in part on the distance between a location associated with the candidate search result and a reference location. An example reference location can be the geometric center of the specified geographic area. The candidate search results are then ranked according to their scores.

SUMMARY

This specification describes technologies relating to ranking location search results based on a combination of multiple distance measures.

In general, one innovative aspect of the subject matter described in this specification can be embodied in methods that include the actions of: receiving search query data specifying a geographic identifier, the geographic identifier denoting a geographic region for which search results associated with one or more entities are requested; receiving a plurality of candidate search results, each candidate search result specifying a physical address including a zip code for a respective entity; calculating, by a processor, a respective location relevance score for each of the candidate search result based on a combination of a first comparison between a geographic location represented by the specified physical address and a polygon approximating a boundary of the geographic region and a second comparison between the zip code specified in the candidate search result and respective zip codes of one or more constituent areas of the geographic region; and ranking the plurality of search results based at least in part on the calculated location relevance scores of the plurality of search results.

Other embodiments of this aspect include corresponding systems, apparatus, and computer programs, configured to perform the actions of the methods, encoded on computer storage devices.

These and other embodiments can each optionally include one or more of the following features.

In some implementations, the action of calculating the respective location relevance score for each of the candidate search results based on the combination of the first comparison and the second comparison further includes, for each candidate search result: calculating a polygon distance score based on a first distance between the geographic location represented by the specified physical address and the polygon approximating the boundary of the geographic region; in response to determining that the zip code specified in the candidate search result is among the respective zip codes of the constituent areas of the geographic region, applying a first predetermined value as a lower limit to the polygon distance score; in response to determining that the zip code specified in the candidate search result is not among the respective zip codes of the constituent areas of the geographic region, applying a second predetermined value as an upper limit to the polygon distance score; and calculating the respective location relevance score for the candidate search result based on the polygon distance score.

In some implementations, the action of calculating the polygon distance score based on the first distance between the geographic location represented by the specified physical address and the polygon approximating the boundary of the geographic region further includes: calculating the polygon distance score by evaluating a continuous piecewise function using the distance as input, wherein value of the function increases with increasing distance values from within the polygon and decreases with increasing distance values from outside of the polygon.

In some implementations, the action of calculating the respective location relevance score for the candidate search result further includes, for each candidate search result: receiving center of location data for the geographic region, the center of location data specifying a central location for the geographic region; calculating a distance-to-center score for the candidate search result based on a distance between the geographic location specified in the physical address of the candidate search result and the central location for the geographic region; and calculating the respective location relevance score for the candidate search result based on the distance-to-center score and the polygon distance score.

In some implementations, the method further includes selecting the central location based on criteria independent of geometry of the geographic region. In some implementations, the central location of the geographic region is a city center location and is greater than a threshold distance away from the geometric center of the geographic region.

In some implementations, the action of ranking the candidate search result further includes: applying the respective location relevance scores for the candidate search results as respective multipliers to another type of relevance score for the candidate search result.

In general, another innovative aspect of the subject matter described in this specification can be embodied in methods that include the actions of: receiving search query data specifying an geographic identifier, the geographic identifier denoting a geographic region for which listings of one or more business entities are requested, the geographic region being associated with a polygon approximating a boundary of the geographic region, zip codes associated with constituent areas of the geographic region, and a central location determined according to criteria independent of geometry of the geographic region; receiving a plurality of candidate business listings, each candidate business listing specifying a physical address for a respective business entity; calculating, by a processor, a respective location relevance score for each of the candidate business listings based on three distances to the physical address, a first distance being measured from the polygon, a second distance being measured from a combined area associated with the zip codes, and a third distance being measured from the central location; and ranking the plurality of candidate business listings based at least in part on the derived location relevance scores of the plurality of candidate business listings.

Particular embodiments of the subject matter described in this specification can be implemented so as to realize one or more of the following advantages. Three basic distance measures can be used to determine whether a candidate search result is within or outside of an area of interest: (1) the distance-to-polygon method, (2) the zip code match method, and (3) the distance-to-center method. In order to provide search results that are the closest to an area specified by the user in a search query, multiple of these distance measures can be used in combination to avoid over-inclusion and under-inclusion of search results due to imperfection of each distance measure. Because the characteristics of over-inclusion and under-inclusion of search results differ between the distance-to-polygon method and the zip code match method, using a combination of these two methods helps to eliminate some of the over-included low quality search results, and recaptures some of the under-included higher quality search results.

A suitably-chosen scoring function is used to score search results based on their respective distances to a polygon of which the edges approximate the boundary of the area of interest. The chosen scoring function allows search results referencing locations outside of the polygon to be considered in the scoring and hence the search result ranking, while at the same time, applying an upper and/or lower bound to the scores depending on the outcomes of the zip code match method for the search results. The lower-bounded scores help salvage some search results that reference locations that are outside of the polygon but inside an included zip code area, while the upper-bounded scores help demote some search results that reference locations that are inside the polygon but outside of an included zip code area.

In addition to the zip code match measure and the distance-to-polygon measure, the distance-to-center measure can be used to provide additional modification to the scoring. The choice of the reference location (namely, the "center") for the location-to-center distance measure can be based on factors other than the geometry of the specified geographic area. Examples of such factors include the type of places being search for, the mode of transportation specified by the user, the size of the specified geographic area, the popularity or dominance of a sub-region in the specified geographic area, and so on. Based on the most relevant factors, the reference locations can be business centers, culture centers, political centers, major highways, major public transit lines, and centers of sub-regions, and so on, within the specified geographic area.

Using the combination of multiple distance measures to score location search results, a more complete and relevant result set can be provided to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A illustrates an example polygon representing a named geographic region.

FIG. 3B illustrates a collection of included zip code areas of a named geographic region.

FIG. 3C illustrates a center of location for a named geographic region.

Like reference numbers and designations in the various drawings indicate like elements.

DETAILED DESCRIPTION

I. An Example Search Interface

Figure 1:
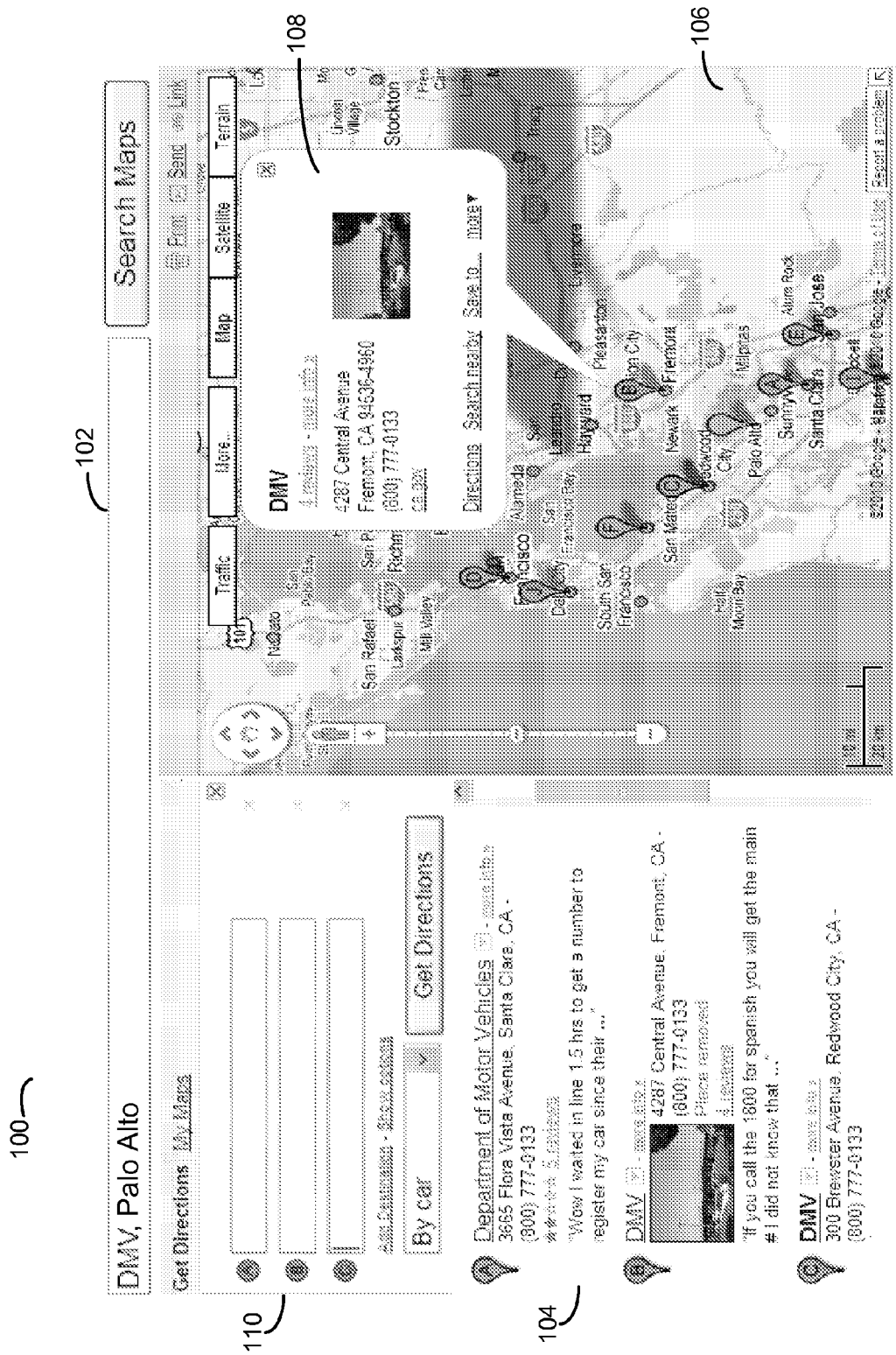
FIG. 1 illustrates an example user interface of an example search system.

FIG. 1 is an example search interface 100 provided by a search system. In some implementations, the search interface 100 can be implemented as one or more webpages and rendered in a browser application executing on a client device. The search interface 100 allows users to find businesses, addresses, and places of interests and locate them on a map.

In this example, the search interface 100 includes an input field 102 for receiving search terms submitted by a user. For example, the user can enter one or more search terms in the input field 102 to specify a complete or partial business name (e.g., "Mario's Pizza"), a subject matter (e.g., "hotel," "DMV"), an address (e.g., 100 A Street, B town, CA), or a place of interest (e.g., Statue of Liberty, etc.).

In some implementations, the input field 102 also allows a user to specify the name of a geographic area (e.g., Palo Alto, Calif.) within or near which search results are desired. In cases where the user does not explicitly specify a geographic area, a relevant geographic area can be inferred from a location associated with the user (e.g., a location derived from the user's IP address, an address that the user has registered with the search system, or a geographic area currently represented in a map shown to the user in the search interface 100).

After the search terms are entered and the geographic search limitations are collected (e.g., the geographic limitations can be either entered in input field 102 by the user or otherwise inferred for the user), the search query is submitted to the search system (e.g., by the user clicking on the "Search Maps" button). The search system identifies relevant search results based on the search terms and geographic limitation(s) included in or with the search query, and returns the search results to the client device. The returned search results can be presented as a result listing 104 in the search interface 100.

In some implementations, each search result represents an entity and includes a name and a physical address of the entity. The term "entity" refers to any named entity (e.g., commercial establishments, government or private agencies, places of interest, public or private facilities, and so on) that is located at a physical address. Each search result can link to a webpage associated with the entity (e.g., an owner-created homepage of the entity or automatically-generated summary page for the entity). In some implementations, additional information, such as an image, logo, reviews, and contact information, associated with the entity represented by each search result can be presented as well, either in the search result page or in the respective webpage associated with the entity.

In some implementations, the search interface 100 includes a map area 106. The map area 106 displays a map for the geographic area associated with the search. The map can be overlaid with one or more visual markers to indicate the physical locations of the entities represented by the top-ranked search results (e.g., top 10 search results).

In some implementations, the search interface 100 allows the user to select each search result individually (e.g., by clicking on an embedded hyperlink in the search result text) to view additional information available about the entity represented by the selected search result. For example, an information window 108 can be presented over the map next to the visual marker of the selected search result to show the additional information.

In some implementations, the search interface 100 also includes a direction request window 110. The user can request directions to an address associated with a search result by entering an address in the direction request window 110. The direction request window 116 includes input fields for a starting address and a destination address. The user may optionally insert one or more intermediate destinations or waypoints between the start and the destination addresses. The user may also enter a mode of transportation for the direction request. Once the user enters the addresses for each input field in the direction request window 110, and submits the direction request (e.g., by clicking on the "Get Directions" button), the search interface 100 can present a suggested route between the start and destination addresses that passes through all of the intermediate destinations or waypoints.

FIG. 1 is but one example of a search interface. Other layouts of the search interface are possible. For example, the different components of the example search interface can be presented on separate webpages, and user interface elements for additional functions can be provided. In addition, the search interface need not be implemented as a map interface, or even as a webpage. Other application interfaces for sending search requests and presenting search results can be implemented.

II. An Example Search System

Figure 2:
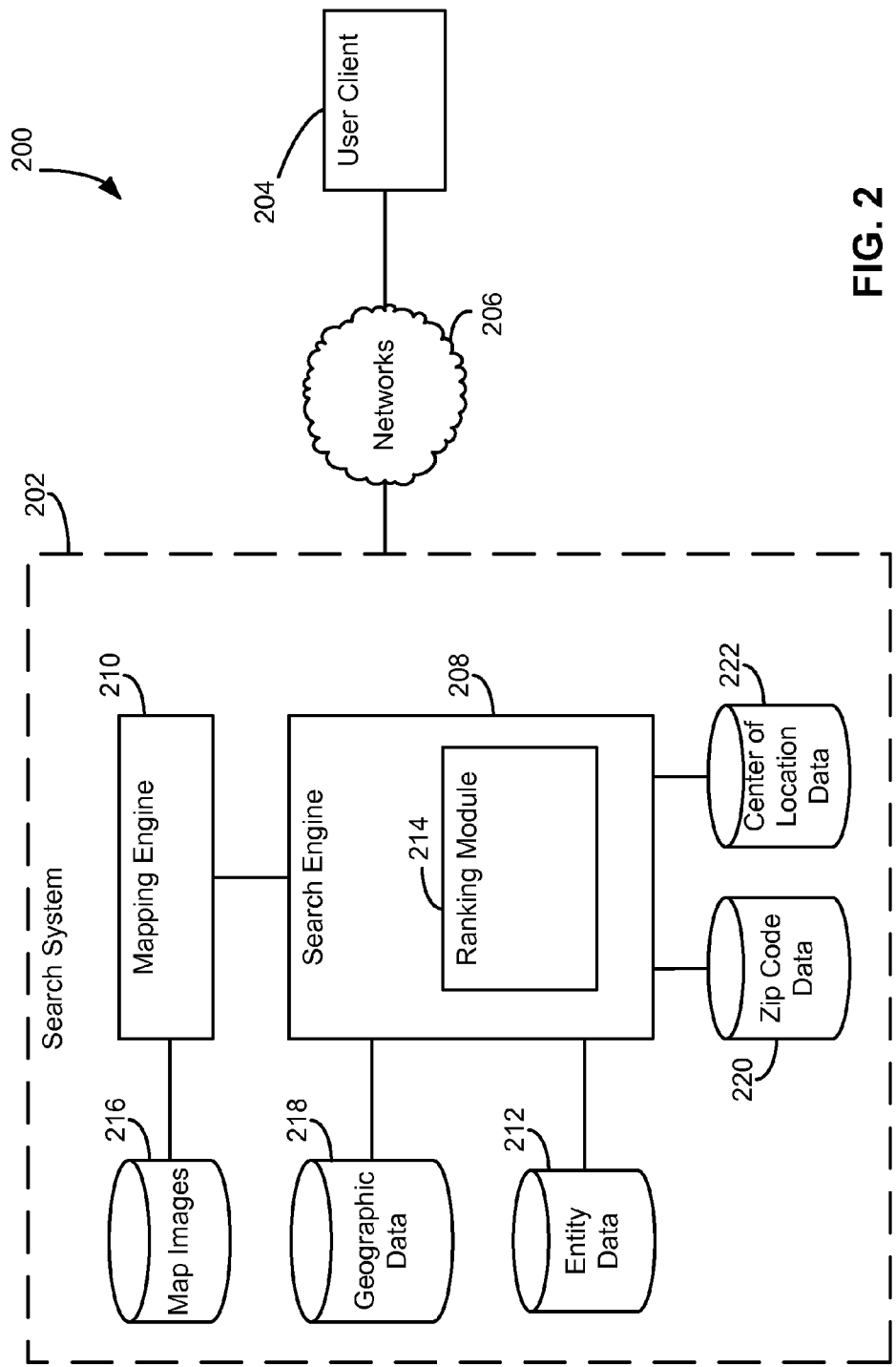
FIG. 2 illustrates an example operating environment for an example search system.

FIG. 2 illustrates an example a network environment 200 in which an example search system 202 operates. The network environment 200 includes and a client device 204 communicating with the search system 202 through one or more networks 206. Examples of the one or more networks 206 include local area networks, wide area networks, wireless networks, peer-to-peer networks, and the Internet. Examples of the client device 204 include desktop computers, notebook computers, tablet computers, personal digital assistants, mobile phones, smart phones, and other fixed and mobile electronic devices.

The search system 202 performs searches for businesses, addresses, and places of interest in response to user-submitted search queries. The search system 202 can provide a search interface such as that shown in FIG. 1. Users accessing the search system 202 through the search interface can enter a search query that specify a geographic area by its name (or by other geographic identifiers of the geographic area) and one or more other keywords or search terms expressing his or her information needs. The search system 102 returns a list of search results representing entities located in the vicinity of the named geographic area in the search query and relevant to the entered keyword(s).

The example search system 202 includes a search engine 208 and a mapping engine 210. The search engine 208 and the mapping engine 210 each has access to a number of data repositories (e.g., databases, search indices, and data logs).

For example, the search engine 208 has access to an entity data repository 212. The entity data repository 212 includes information regarding entities (e.g., businesses, government agencies, and places of interest, etc.). The entity data repository 212 can include entity listings collected via voluntary registration by business owners or commercial business data feeds (e.g., local white and yellow pages). In some implementations, the entity data repository 212 may also include information culled from webpages of various entities (e.g., on official websites of government and private entities) on the Internet.

The entity data stored in the entity data repository 212 can include, for a particular entity, the name, physical addresses of locations of the entity (e.g., lat/long coordinates, street address and postal codes of stores for an entity, etc.), contact information, website URL, etc. of the entity. Other information associated with an entity (e.g., a picture of the physical building or storefront of the entity, etc.) can be stored in the entity data repository 212 as well. In some implementations, the entity data repository 212 is implemented as a database or as a searchable index.

When the search engine 208 receives a search query from the client device 204, the search engine 208 can identify from the entity data repository 212 entity listings that match the keywords specified in the search query. In some implementations, the search engine 208 includes a ranking module 214 that ranks the entity listings based on one or more criteria, such as the locations associated with the entity listings, the popularity, reviews, and user feedback associated with the entity listings. More details of the ranking based on the locations of the entities are provided in other portions of the specification.

The mapping engine 210 has access to a map images repository 216 and a geographic data repository 218. The mapping engine 210 can correlate addresses and location names to geocodes (e.g., latitude and longitude of a geographic location in the latitude/longitude coordinate system) based on the information in the geographic data repository 218. The mapping engine 210 can also identify map images in the map images repository 216 that correspond to particular locations or geocodes and nearby areas. Further, the mapping engine 210 can overlay other information, such as location markers and routes associated with driving directions, on the map images for presenting to a user.

In some implementations, when the search engine 208 identifies listings of matching entities in the entity data repository 212, the search engine 208 transmits the addresses of the matching entities to the mapping engine 210. The mapping engine 210 matches the entity addresses to geocodes and identifies map images corresponding to the geocodes.

The search system 202 then generates a search result page that includes an embedded map and the search results representing the matching entities. The search results include names and corresponding addresses of the matching entities, and the embedded map includes visual markers indicating physical locations of the matching entities on the embedded map. In some implementations, the visual markers are only provided for the top-ranked results.

III. Scoring Search Results Based on a Combination of Multiple Distance Measures In some implementations, the ranking module 214 of the search engine 208 shown in FIG. 2 has access to the geographic data repository 218, a zip code data repository 220, and a center-of-location data repository 222. Each of the geographic data repository 218, the zip location code data repository 220, and/or the center-of-location data repository 222 can be provided by one or more third-party systems or internally by the search system 202. Although depicted a logically separate data repositories, the data repositories could also be implemented as a single logical date repository.

In some implementations, the ranking module 214 can query and obtain data from the data repositories through an interface provided by the third-party systems or the search system 202. In some implementations, the search engine 208 includes one or more other components to process the obtained raw data and provide only the information needed by the ranking module 214 to the ranking module 214.

The geographic data repository 218 stores correlations between addresses and location names to their corresponding geocodes (e.g., the latitude and longitude of the geographic location represented by each address and/or location name). The geographic data repository 218 can also provide specifications of one or more polygons that approximate the actual boundary of a named geographic area (e.g., a lake, mountain, city, county, district, state, country, park, golf course, etc.). Polygons of a named geographic area may be of various degrees of resolutions. A low resolution polygon has fewer edges than a high resolution polygon. A polygon having a suitable resolution can be chosen by the ranking module 216 to approximate the actual boundary of the geographic area specified in the search query.

The ranking module 214 can determine whether the location of an entity represented by a search result is within an area of interest (e.g., the geographic area specified in the search query) by comparing the location to the polygon of the area of interest. In a basic polygon method used in some conventional search systems, if the location is inside the polygon, the location is considered to be inside the area of interest, and if the location is outside the polygon, the location is considered to be outside of the area of interest. In the basic polygon method, a high score is given to a location inside the polygon and a low score is given to another location outside the polygon, even if the two locations are actually very close to each other.

Although the basic polygon method is useful in filtering out search results that are associated with locations far away from the area of interest, the basic polygon method may over-include or under-include search results near the edges of the polygon because the edges are merely approximation of the actual boundary of the area of interest.

For example, as shown in FIG. 3A, a polygon 302 (solid line) representing a hypothetical geographic area (e.g., "Green City") has been obtained from the geographic data repository 218 using the name or other identifier of the geographic area. The actual boundary 304 of the named geographic area (e.g., the city limits of "Green City") is shown in dashed lines. As evidenced by the discrepancies between the polygon edges (solid line) and the actual boundary (dashed line) of the named geographic area, the polygon 302 includes some areas (e.g. area 306) that are not part of the named geographic area, while excluding some other areas (e.g., area 308) that are part of the named geographic area. Entities that are located within the non-overlapping portions of the polygon and the area of interest are arbitrarily included (e.g., entity 310*b*) or excluded (e.g., entity 310*a*) due to the artificially created discrepancies. In some implementations, in the interest of conserving data storage space or processing power, simple polygons with fewer edges are used to determine whether a search result is within an area of interest. In such cases, the basic polygon method can lead to large errors if not checked or compensated by other location relevance measures.

The location code data repository 220 provides correlations between addresses and location names to one or more zip codes. Each zip code represents a corresponding zip code area. An example zip code system is the postal codes used by the United States Postal Service. Similar postal code systems exist in other countries as well. A zip code can be a sequence of letters and/or numbers. For example, zip code 43210 represents the Ohio State University area, and the zip code range 20200-20599 includes the zip codes for the Washington D.C. area.

The ranking module 214 can obtain a list of zip codes (e.g., a zip code range) for the zip code areas that are at least partially inside the geographic region specified in the search query. For example, by querying the zip code data repository 220 with the name of the geographic region specified in the search query, the ranking module 214 can obtain the list of zip codes. In a basic zip code match method used by some convention search systems, the zip code contained in the address associated with each candidate search result is compared to the list of included zip codes for the geographic area specified in the search query. If the zip code in the address of a candidate search result is found in the list of included zip codes for the geographic area, the candidate search result is considered to be inside the area of interest. On the other hand, if the zip code associated with the candidate search result is not found in the list of included zip codes, the candidate search result is considered to be outside the area of interest.

Despite the apparent connection between geographic areas and zip codes, what zip codes really represent are address groups and mail delivery routes. The area covered by each zip code can be larger or smaller compared to a named geographic area. The boundary of a zip code area often does not match the boundary of a named geographic area. Two locations on two sides of the same street can belong to two different zip code areas, while two other locations that are far apart can belong to the same zip code area.

Although the basic zip code method is a fast and simple method with little computation involved, similar to the basic polygon method, the basic zip code match method cause arbitrary over-inclusion and under-inclusion of potential search results due to the discrepancies between the included zip code areas of the named geographic region and the actual area enclosed in the named geographic region.

As shown in FIG. 3B, the actual boundary 304 of the named geographic region (e.g., "Green City") is represented by the dashed line. The named geographic region includes at least portions of three distinct zip code areas (e.g., zip code area 312, zip code area 314, and zip code area 316). Zip code area 312 only has a small portion within the geographic region specified in the search query, and a large portion outside of the geographic region specified in the search query. A search result 318 is inside the zip code area 312, but is far away from the specified geographic region. Search result 318 would be an over-included poor search result due to its large distance from the specified geographic region. On the other hand, a potentially better search result 320 is outside of the geographic region by a small distance, and is far closer to the geographic region than search result 318. Search result 320 becomes an under-included search result because it is not within any zip code areas of the geographic region.

The zip code system is one example of location code systems that specify locations based on a functional representation that is not directly tied to location. In some implementations, location codes from another location code system (e.g., area codes used for the PSTN telephone network) can be used to determine whether a location referenced by a search result is within a geographic area in a similar manner as described with respect to the basic zip code match method. The methods described with respect to zip codes in this specification are also applicable to these other location code systems.

To improve over the basic polygon method and the basic zip code match method, a continuous scoring function can be used in some implementations. The continuous scoring function applies location relevance scores to potential search results based on distances between the locations associated with each potential search result and the polygon approximating the boundary of the specified geographic region. By using a continuous scoring function instead of a binary scoring function (Inside vs. Outside) decision, locations immediately outside of the polygon or the included zip code areas are not rejected outright. Similarly, a location within an included zip code area or the polygon is not outright accepted, either.

In some implementations, the scoring function results in increasing values for increasing distance from the polygon boundary when the location under evaluation is inside the polygon. This indicates that, for locations inside the polygon, a higher score is given to a location near the center of the polygon than a location near the edge of the polygon.

In addition, the scoring function results in decreasing values for increasing distance from the polygon boundary when the location under evaluation is outside of the polygon. This indicates that, for locations outside of the polygon, a lower score is given to a location far away from the edge polygon than a location near the edge of the polygon.

Further, in some implementations, the scoring function is continuous across the boundary of the polygon such that two locations near the same polygon edge receive similar scores even if they are on two sides of the polygon edge. For example, the scoring function can be two different functions that are piecewise continuous so that a location on a polygon edge results in the same score by both scoring functions.

By using a continuous scoring function that spans across the polygon boundary, scores can be computed for all candidate search results regardless of whether they are within or outside of the polygon or any included zip code areas. All candidate search results can be compared and ranked against one another based on the scores, reducing the chance of over- and under-inclusion of search results.

To further reduce the over- and under-inclusion of potential search results, the outcome of the basic zip code match method can be used to modify the scoring function. In some implementations, a lower limit $W_2$ can be applied to the scores of location inside the included zip code areas. The lower limit $W_2$ can help recapture some search results that are outside of the polygon but inside an included zip code area. This recapturing is helpful when the polygon under-includes potential search results located inside the geographic area but outside of the polygon (e.g., entity 310*a*). In some implementations, an upper limit $W_3$ can be applied to the scores of locations that are not within any of the included zip code areas. This upper limit $W_3$ helps to reduce the over-inclusion of search result that are inside the polygon but outside of the area of interest (e.g. entity 310*b*).

By using the combination of zip code match result and the scoring function based on distance to the polygon, the over-inclusion and under-inclusion of search results in the basic polygon method and the basic zip code method are reduced. For example, a search result (e.g., entity 320) close to a geographic region can be considered by the ranking module 214 and possibly recaptured as a valid search result based on its score, even if it is outside of any included zip code area of the geographic region. In addition, results that are far away from a geographic region (e.g., entity 318) can be excluded for having a low score, even though it is within an include zip code area of the geographic region.

Figure 4:
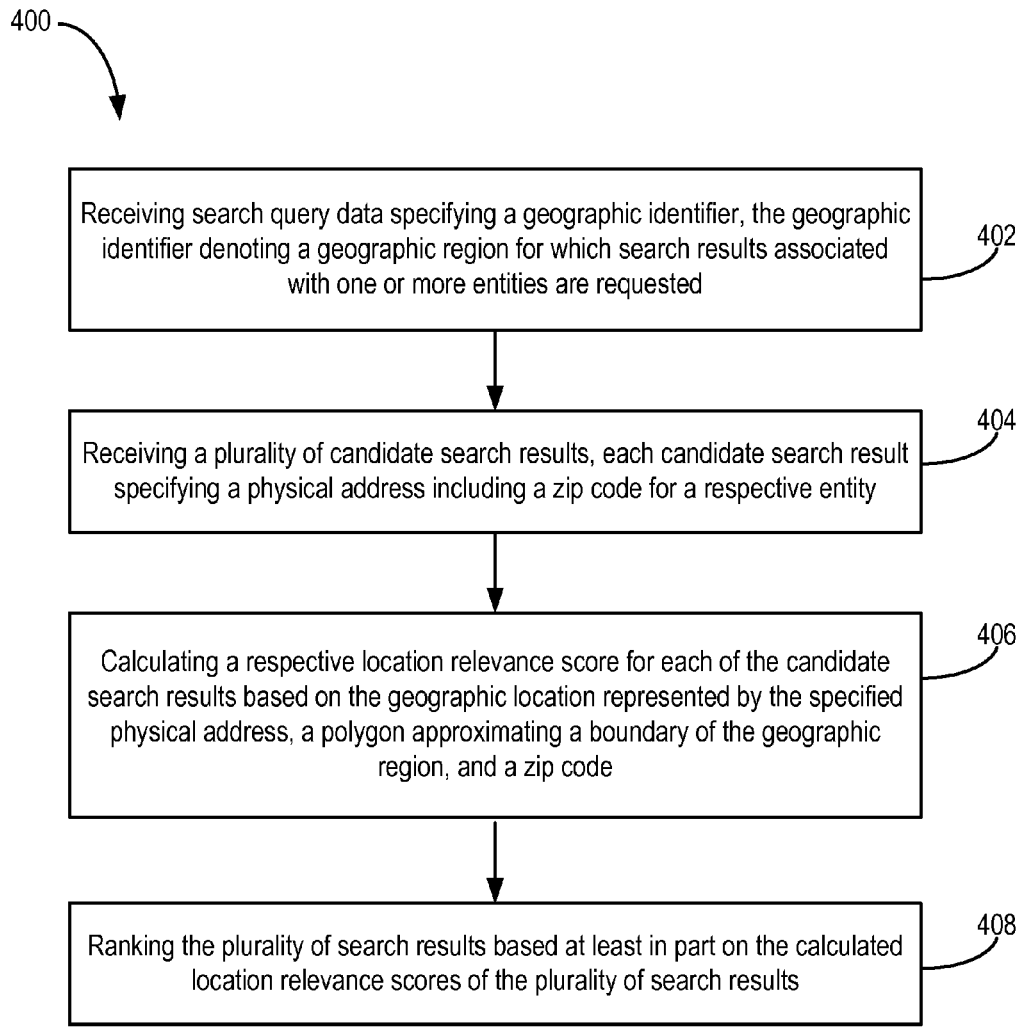
FIG. 4 is a flow diagram of an example process for ranking search results based on combined zip code match and distance-to-polygon measures.
Figure 5:
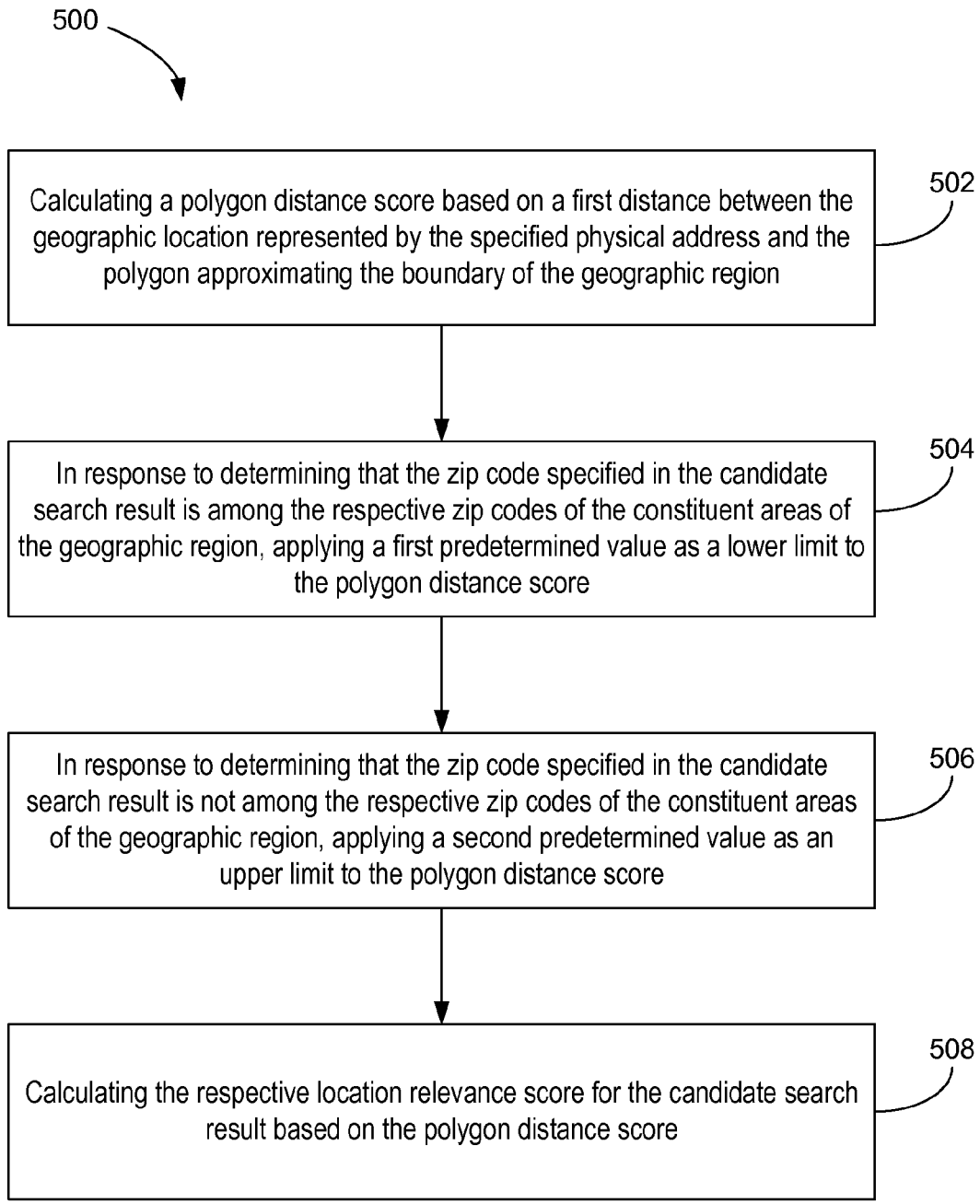
FIG. 5 is a flow diagram of an example process for calculating a location relevance score based on combined zip code match and distance-to-polygon measures.

More details on scoring candidate search results based on the combination of the distance-to-polygon measure and the zip code match measure is described with respect to FIGS. 4-5.

In some implementations, the ranking module 214 uses a distance-to-center method to score the candidate search results. As shown in FIG. 3C, in a basic distance-to-center method, the center of a geographic region is the geometric center (e.g., center 322) of the geographic region (e.g., geographic region 304). Entity 324 is farther away from the center 322 than entity 328, and would be given a higher distance-to-center score than entity 328. However, in reality, the geometric center of the geographic region 304 could be a location of no significant to the user, and the distance from a result entity to this location has little to do with the location relevance of the result entity.

An alternate choice of central location (e.g., center 324) can be found based on criteria independent of the geometry of the geographic region. The distance from a result entity to this central location, can, in some situations, result in a better measure of the location relevance of the result entity. For example, the central location can be chosen to be the current location of the user. Result entity 326 is much closer to the current location of the user than result entity 328, and is potentially a more relevant result to the user than result entity 328, at least in terms of location.

The center-of-location data repository 222 can store one or more central locations for each named geographic region. The center-of-location data can be predetermined by various processes or computed on the fly based on one or more criteria. For example, the central location for a city can be the location associated with the City Hall of the city, the city center of the city, a city landmark, etc. For another example, the central location for a city, a county, or a state can be the locations associated with major public transit stops, or major high way junctions, etc. The criteria for selecting the central location for a named geographic region can be user-dependent, application-dependent, time-dependent, area-dependent, and so on. More details about the selection of central location are found in the description with respect to FIG. 6.

In some implementations, the distance-to-center score can be used to generate a distance-to-center multiplier, and the score generated from the combined zip code match and distance-to-polygon measures can be used to generate a distance-to-polygon multiplier. The distance-to-center multiplier and the distance-to-polygon multiplier can be used in conjunction with other relevance multipliers to calculate the relevance scores for the candidate search results. By using the distance to central location measure as an additional means to balance the zip code match and the distance to polygon measures, arbitrary over-inclusion and under-inclusion of search results can be reduced further. In addition, the choice of the central location(s) can be made application-dependent, user-dependent, time-dependent, or area-dependent. Using this additional distance measure, more relevant search results can be identified and provided to the user.

Example Processes for Scoring Search Results based on Combined Distance Measures FIG. 4 is a flow diagram of an example process 400 for ranking search results based on combined zip code match and distance-to-polygon measures. The process can be performed by the search engine 208 of FIG. 2, for example.

The process 400 starts when search query data specifying a geographic identifier is received (402). The geographic identifier denotes a geographic region for which search results associated with one or more entities are requested. The geographic identifier can be a name of the geographic region specified by a user in the search query or inferred by the search system based on other information known about the user (e.g., registered address, IP address, current address, etc.).

The process 400 continues when a plurality of candidate search results are received (404). Each candidate search result specifies a physical address including a zip code for a respective entity. In some implementations, the candidate search results are identified based on other relevance measures, such as keyword matching based on search terms entered by the user. The candidate search results are selected from be entity listings stored in the entity data repository 212 of FIG. 2 or webpages indexed in a searchable index. Each candidate search result includes a physical address for an entity (e.g., a business entity, a government agency, a public facility, a place of interest, etc.). The physical address includes a zip code for mail delivery, such as the zip code used by the United States Postal Services.

A respective location relevance score is calculated for each of the candidate search results based on the geographic location represented by the specified physical address, a polygon approximating a boundary of the geographic region, and a zip code (406). For example, a respective location relevance score is calculated for each of the candidate search results based on a combination of a first comparison between a geographic location represented by the specified physical address and a polygon approximating a boundary of the geographic region and a second comparison between the zip code specified in the candidate search result and respective zip codes of one or more constituent areas of the geographic region.

The polygon approximating the boundary of the specified geographic region in the search query can be obtained from third party data geographic data services. In some implementations, the polygon can be a simplified polygon with a reduced number of edges than the original polygon received from the third party geographic data services. By reducing the number of polygon edges, data storage and processing resources required for the first comparison can be reduced. In some implementations, the comparison between the polygon and the location represented by the specified address involves determining whether the location is inside or outside of the polygon, and the distance between the location and a nearest edge of the polygon.

The respective zip codes of one or more constituent areas of the geographic region can be determined by consulting a zip code data repository. By submitting the name of a geographic region to a zip code data lookup service, a list of zip codes or zip code ranges can be retrieved for the constituent areas of the named geographic region. The comparison between the zip code for the candidate search result and respective zip codes of the constituent areas of the geographic region involves determining whether the zip code for the candidate search result is among the list of zip codes for the constituent areas of the geographic region. If the zip code is found in the list of zip codes, the entity represented by the candidate search result is deemed to be within the included zip code areas of the geographic region. If the zip code is not found in the list of zip codes, the entity represented by the candidate search result is deemed to be outside of the included zip code areas of the geographic region.

The location relevance score for a candidate search result is calculated based on a combination of the first comparison and the second comparison. As described with respect to FIG. 5, the outcome of the second comparison (i.e., the zip code match) can be combined with the results of the first comparison (i.e., the distance) through a piecewise distance-to-polygon scoring function.

After the location relevance scores for the candidate search results are calculated, the plurality of search results are ranked based at least in part on the calculated location relevance scores of the plurality of search results (408). In some implementations, the location relevance scores can be used as multipliers for relevance values obtained from other methods to calculate the ultimate relevance scores of the candidate search results, and the candidate search results are ranked based on the ultimate relevance scores.

FIG. 5 is a flow diagram of an example process 500 for calculating a location relevance score based on combined zip code match and distance-to-polygon measures.

In some implementations, for each candidate search result, a polygon distance score can be calculated based on a first distance between the geographic location represented by the specified physical address associated with the candidate search result and the polygon approximating the boundary of the geographic region (502). This first distance can be calculated based on basic geometric principles. In some implementations, the polygon distance score is calculated by evaluating a continuous piecewise function using the distance as input, where the value of the function increases with increasing distance values from within the polygon and decreases with increasing distance values from outside of the polygon.

In some implementations, an example piecewise function that can be used as the polygon distance scoring function is:

$$\text{Score}(D) = \begin{cases} \sqrt{W^2/(W+D^2)^2} & D < 0 \\ (1+W) - W\sqrt{w^2/(w+D^2)^2} & D \geq 0 \end{cases}$$

In the above polygon distance scoring function, W and w are adjustable weights for the polygon distance score, Score(D). The magnitude of D is the distance values for the location under evaluation. D is a negative value if the location is outside of the polygon and a positive value if the location is inside the polygon. Example values of W and w are real numbers between 0 and 1. The values of W and w can be tuned based on the quality of the search results generated using different values of W and w.

After an initial polygon distance score is calculated based on the polygon distance scoring function, the score is modified based on the outcome of the zip code match for the location under evaluation. First, it is determined whether the location is inside or outside of the included zip code areas of the geographic region. In response to determining that the zip code specified in the candidate search result is among the respective zip codes of the constituent areas of the geographic region, a first predetermined value ($W_2$) is applied as a lower limit to the polygon distance score (504). In some implementations, $W_2$ is a positive real number that is less than 1. The lower limit only has an effect on the polygon distance score if the value of initial polygon distance score is below this lower limit $W_2$. By applying this lower limit, the scores for some search results that are within an included zip code area of the geographic region are prevented from becoming too low due to an under-inclusive polygon shape. Therefore, the lower limit can help salvage some potential valid search results.

In addition, in response to determining that the zip code specified in the candidate search result is not among the respective zip codes of the constituent areas of the geographic region, a second predetermined value ($W_3$) is applied as an upper limit to the polygon distance score (506). In some implementations, $W_3$ is a positive real number greater than $W_2$ and less than 1. By applying this upper limit, the scores for some search results that are outside the included zip code areas of the geographic region are prevented from becoming too high due to an over-inclusive polygon shape. Therefore, the upper limit can help filter out some potentially invalid search results.

After the polygon distance scores are calculated, the respective location relevance score for the candidate search result are calculated based on the polygon distance score (508). In some implementations, the polygon distance score is used as a multiplier in calculating the location relevance score.

Figure 6:
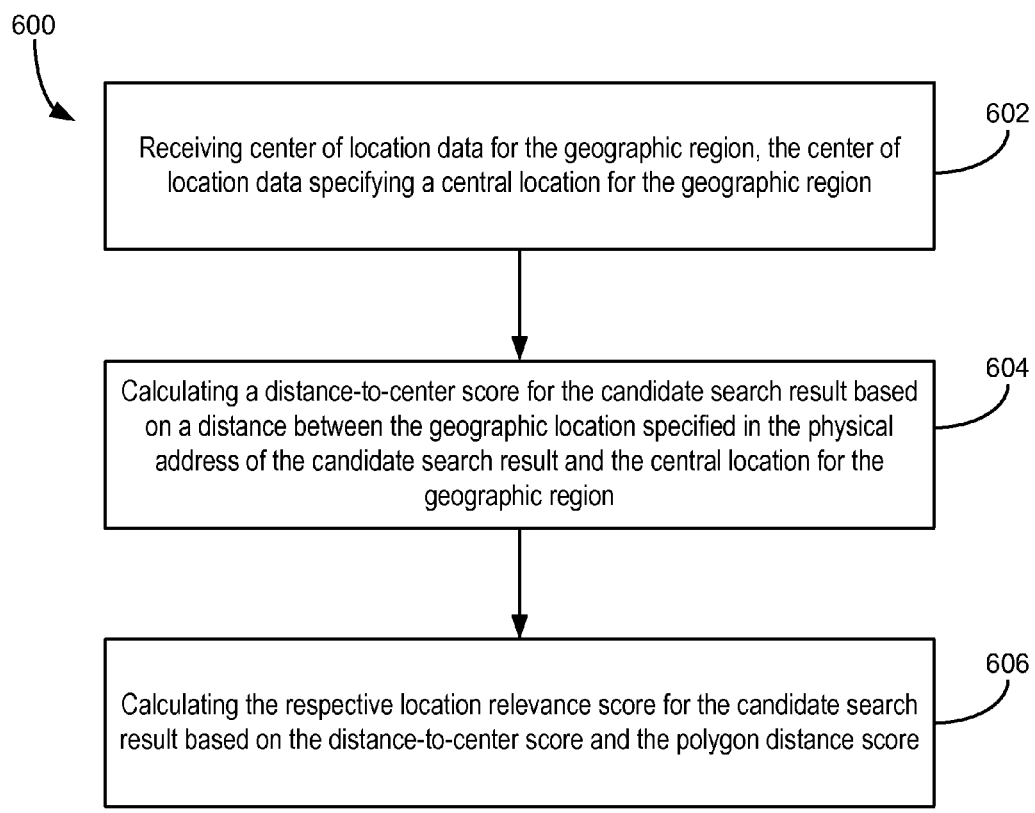
FIG. 6 is a flow diagram of an example process for calculating a location relevance score further based on a distance-to-center measure.

FIG. 6 is a flow diagram of an example process 600 for calculating a location relevance score further based on a distance-to-center measure.

In the process 600, for each candidate search result, center of location data is received for the geographic region specified in or with the search query, the center of location data specifying a central location for the geographic region (602). In some implementations, the central location is predetermined. In some implementations, the central location is determined on the fly based on one or more criteria, e.g., a user's location relative to the geographic region.

A distance-to-center score is calculated for the candidate search result based on a distance between the geographic location specified in the physical address of the candidate search result and the central location for the geographic region (604). Then, the respective location relevance score for the candidate search result is calculated based on the distance-to-center score and the polygon distance score (606).

In some implementations, the process 600 includes selecting the central location based on criteria independent of geometry of the geographic region. Criteria independent of the geometry of the geographic region include, for example, the user's current location, the business center of the geographic region (e.g., the downtown center), the political center of the geographic location (e.g., the City Hall, the State Capitol, etc.), etc. In some implementations, the central location of the geographic region is a city center location and is greater than a threshold distance away from the geometric center of the geographic region.

In some implementations, multiple central locations can be identified, and the distance-to-center can be measured from any of the identified central locations. For example, major public transit hubs or stations within the specified geographic region, major highway junctions within the specified geographic region, major landmarks within the specified geographic region, can be used as the central locations in different implementations.

In some implementations, the criteria for selecting central locations can be time-dependent, user-dependent, area-dependent, transportation-dependent, etc. In some implementations, the criteria can be changed based on the presence of a combination of the above factors. The choice of the criteria can be user-specified. Alternatively, rules can be set up previously and used to determine the criteria on the fly based on the actual conditions that are present at the time the search is performed. Once the criteria for selecting central locations are determined, the central locations are selected based on the determined criteria, the distance-to-center scores are then calculated based on the selected central locations.

In some implementations, when ranking the candidate search result, the respective location relevance scores for the candidate search results are applied as respective multipliers to another type of relevance score for the candidate search result. Other types of relevance scores include, for example, a relevance score based on keyword matching for the search terms, the popularity score based on user feedback (e.g., selection of the search result), the location prominence score based on how much it is referenced or mentioned by reviews or webpages of other candidate search results, etc.

Figure 7:
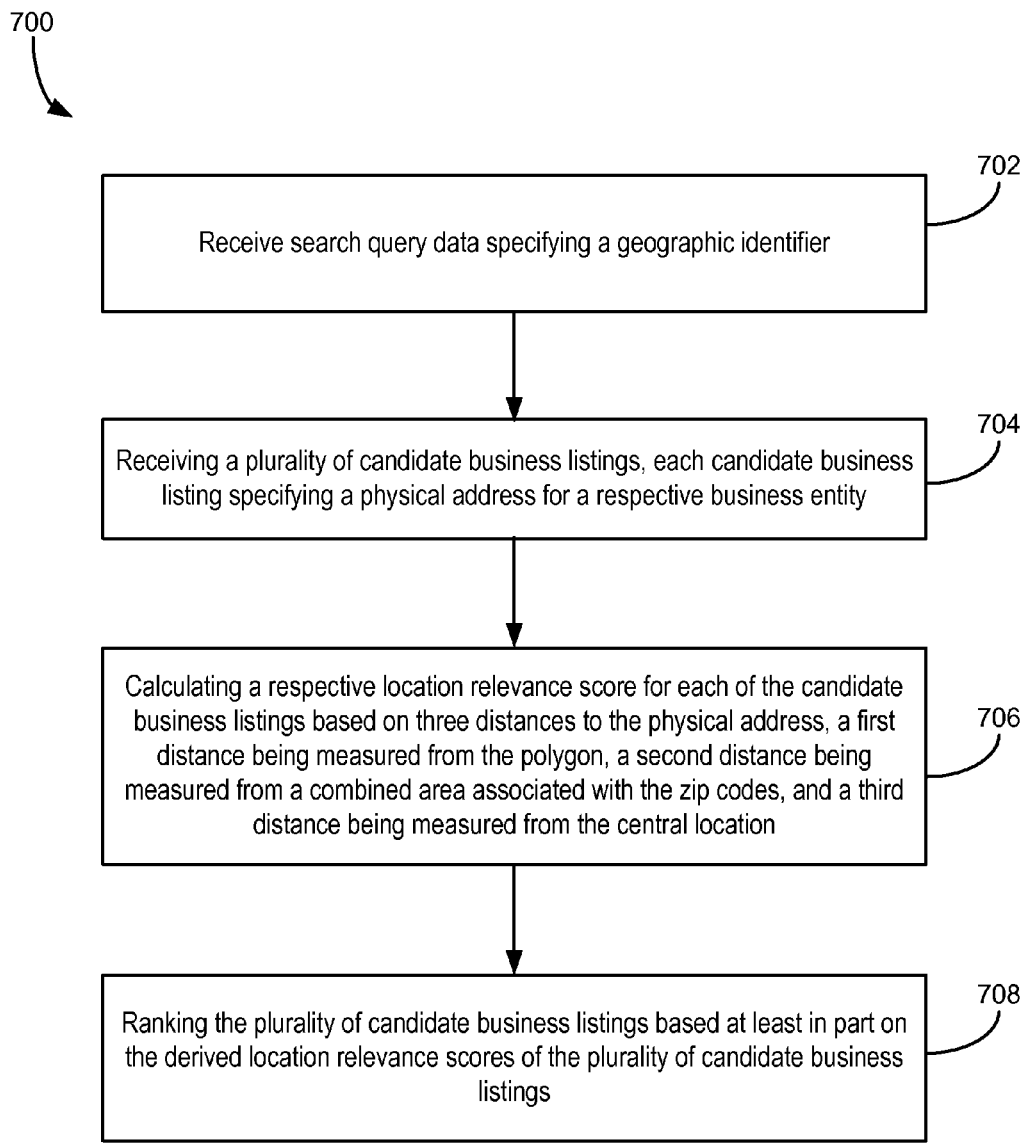
FIG. 7 is a flow diagram of an example process for ranking search results based on a combination of multiple distance measures.

FIG. 7 is a flow diagram of an example process 700 for ranking search results based on a combination of multiple distance measures. Details of the process 700 can be found in the description of FIGS. 1-6. The process 700 starts when search query data specifying a geographic identifier is received (702). The geographic identifier denotes a geographic region for which listings of one or more business entities are requested. The geographic region is associated with a polygon approximating a boundary of the geographic region, zip codes associated with constituent areas of the geographic region, and a central location determined according to criteria independent of geometry of the geographic region.

A plurality of candidate business listings are received, each candidate business listing specifying a physical address for a respective business entity (704). A respective location relevance score is calculated for each of the candidate business listings based on three distances to the physical address (706). For example, the first distance is measured from the polygon, the second distance is measured from a combined area associated with the zip codes, and the third distance being measured from the central location. The plurality of candidate business listings are ranked based at least in part on the derived location relevance scores of the plurality of candidate business listings (708).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   receiving, by one or more processors, a search query and a geographic region associated with the search query, the geographic region having a central location and a bounding polygon;
   identifying, by the one or more processors, a plurality of candidate search results responsive to the search query, each candidate search result being associated with a geographic location;
   calculating, by the one or more processors and for each candidate search result, a central distance score, wherein the central distance score comprises a score based on a first geographic distance between the geographic location of the candidate search result and the central location of the geographic region;
   calculating, by the one or more processors and for each candidate search result, a polygon distance score, wherein the polygon distance score changes as a scoring function of a second geographic distance between the geographic location of the candidate search result and an edge of the bounding polygon of the geographic region nearest the geographic location of the candidate search result, wherein the scoring function uses the second geographic distance as an input and the polygon distance score is subject to a score limit;
   calculating, by the one or more processors and for each candidate search result, a respective location relevance score based on the central distance score and the polygon distance score for the candidate search result; and
   ranking, by the one or more processors, the plurality of candidate search results based at least in part on the calculated location relevance scores of the plurality of candidate search results.

2. The method of claim 1, wherein each of the candidate search results is associated with a zip code, and calculating the polygon distance score further comprises determining, for each candidate search result, whether the zip code for the candidate search result is included in a list of zip codes for the geographic region;
   assigning a first predetermined value to the polygon distance score if the zip code is included in the list of zip codes for the geographic region and, the polygon distance score is less than the first predetermined value;
   assigning a second predetermined value to the polygon distance score if the zip code is not included in the list of zip codes for the geographic region and the polygon distance score is greater than the second predetermined value.

3. The method of claim 1, wherein the polygon distance score is based on a piece-wise continuous function that is continuous across the polygon boundary, the piece-wise continuous function having a first part that increases with second geographic distance when the geographic location is within the bounding polygon and a second part that decreases with the second geographic distance when the geographic location is outside of the bounding polygon further, comprising:
   determining, for each candidate search result, whether the geographic location is within the bounding polygon; and
   calculating the polygon distance score using the first part of the piece-wise continuous function if the geographic location is within the bounding polygon and using the second part of the piece-wise continuous function if the geographic location is outside of the bounding polygon.

4. The method of claim 1, further comprising:
   selecting the central location based on criteria independent of geometry of the geographic region.

5. The method of claim 1, wherein the central location of the geographic region is a city center location.

6. The method of claim 1, further comprising:
   for each of the candidate search results, combining the respective location relevance score for the candidate search result with another type of relevance score for the candidate search result prior to ranking the plurality of candidate search results.

7. The method of claim 1, wherein calculating a polygon distance score for candidate search results having geographic locations inside the bounding polygon of the geographic region comprises employing a function wherein:
   the polygon distance score increases as a function of increasing distance between the geographic location of the candidate search result and the edge of the bounding polygon; and
   the polygon distance score is subjected to a lower score limit, and
   wherein calculating a polygon distance score for candidate search results having geographic locations outside the bounding polygon of the geographic region comprises employing a function wherein:
   the polygon distance score decreases as a function of increasing distance between the geographic location of the candidate search result and the edge of the bounding polygon; and
   the polygon distance score is subjected to an upper score limit.

8. A non-transitory computer storage medium encoded with a computer program, the program comprising instructions that when executed by data processing apparatus cause the data processing apparatus to perform operations comprising:
   receiving a search query and a geographic region associated with the search query, the geographic region having a central location and a bounding polygon;
   identifying a plurality of candidate search results responsive to the search query, each candidate search result specifying a geographic location;
   calculating, for each candidate search result, a central distance score, wherein the central distance score comprises a score based on a first geographic distance between the geographic location of the candidate search result and the central location of the geographic region;
   calculating, for each candidate search result, a polygon distance score, wherein the polygon distance score changes as a scoring function of a second geographic distance between the geographic location of the candidate search result and an edge of the bounding polygon of the geographic region nearest the geographic location of the candidate search result, wherein the scoring function uses the second geographic distance as an input and the polygon distance score is subject to a score limit;

calculating, for each candidate search result, a respective location relevance score based on the central distance score and the polygon distance score for the candidate search result; and ranking the plurality of candidate search results based at least in part on the calculated location relevance scores of the plurality of candidate search results.

9. The computer storage medium of claim 8, wherein each of the candidate search results is associated with a zip code, and calculating the polygon distance score further comprises:

determining, for each candidate search result, whether the zip code for the candidate search result is included in a list of zip codes for the geographic region;

assigning a first predetermined value to the polygon distance score if the zip code is included in the list of zip codes for the geographic region and, the polygon distance score is less than the first predetermined value;

assigning a second predetermined value to the polygon distance score if the zip code is not included in the list of zip codes for the geographic region and the polygon distance score is greater than the second predetermined value.

10. The computer storage medium of claim 8, wherein the polygon distance score is based on a piece-wise continuous function that is continuous across the polygon boundary, the piece-wise continuous function having a first part that increases with the second geographic distance when the geographic location is within the bounding polygon and a second part that decreases with the second geographic distance when the geographic location is outside of the bounding polygon, and wherein the instructions cause the data processing apparatus to further perform operations comprising:

determining, for each candidate search result, whether the geographic location is within the bounding polygon; and calculating the polygon distance score using the first part of the piece-wise continuous function if the geographic location is within the bounding polygon and using the second part of the piece-wise continuous function if the geographic location is outside of the bounding polygon.

11. The computer storage medium of claim 8, wherein the operations further comprise:

selecting the central location based on criteria independent of geometry of the geographic region.

12. The computer storage medium of claim 8, wherein the central location of the geographic region is a city center location.

13. The computer storage medium of claim 8, wherein the instructions cause the data processing apparatus to further perform operations comprising:

for each of the candidate search results, combining the location relevance score for the candidate search result with another type of relevance score for the candidate search result prior to ranking the plurality of candidate search results.

14. The computer storage medium of claim 8, wherein calculating a polygon distance score for candidate search results having geographic locations inside the bounding polygon of the geographic region comprises employing a function wherein:

the polygon distance score increases as a function of increasing distance between the geographic location of the candidate search result and the edge of the bounding polygon; and the polygon distance score is subjected to a lower score limit, and wherein calculating a polygon distance score for candidate search results having geographic locations outside the bounding polygon of the geographic region comprises employing a function wherein:

the polygon distance score decreases as a function of increasing distance between the geographic location of the candidate search result and the edge of the bounding polygon; and the polygon distance score is subjected to an upper score limit.

15. A system, comprising:

one or more processors;

memory including instructions, which when executed by the one or more processors, cause the one or more processors to perform operations comprising:

receiving a search query and a geographic region associated with the search query, the geographic region having a central location and a bounding polygon;

identifying a plurality of candidate search results responsive to the search query, each candidate search result specifying a geographic location;

calculating, for each candidate search result, a central distance score, wherein the central distance score comprises a score based at least in part on a first geographic distance between the geographic location of the candidate search result and the central location of the geographic region;

calculating, for each candidate search result, a polygon distance score, wherein the polygon distance score changes as a scoring function of a second geographic distance between the geographic location of the candidate search result and an edge of the bounding polygon of the geographic region nearest the geographic location of the candidate search result, wherein the scoring function uses the second geographic distance as an input and the polygon distance score is subject to a score limit;

calculating, for each candidate search result, a respective location relevance score based on the central distance score and the polygon distance score for the candidate search result; and ranking the plurality of candidate search results based at least in part on the calculated location relevance scores of the plurality of candidate search results.

16. The system of claim 15, wherein each of the candidate search results is associated with a zip code, and calculating the polygon distance score further comprises:

determining, for each candidate search result, whether the zip code for the candidate search result is included in a list of zip codes for the geographic region;

assigning a first predetermined value to the polygon distance score if the zip code is included in the list of zip codes for the geographic region and, the polygon distance score is less than the first predetermined value;

assigning a second predetermined value to the polygon distance score if the zip code is not included in the list of zip codes for the geographic region and the polygon distance score is greater than the second predetermined value.

17. The system of claim 15, wherein the polygon distance score is based on a piece-wise continuous function that is continuous across the polygon boundary, the piece-wise continuous function having a first part that increases with the second geographic distance when the geographic location is within the bounding polygon and a second part that decreases with the second geographic distance when the geographic location is outside of the bounding polygon, the one or more processors further performing operations comprising:

determining, for each candidate search result, whether the geographic location is within the bounding polygon; and calculating the polygon distance score using the first part of the piece-wise continuous function if the geographic location is within the bounding polygon and using the second part of the piece-wise continuous function if the geographic location is outside of the bounding polygon.

18. The system of claim 15, wherein the operations further comprise:

selecting the central location based on criteria independent of geometry of the geographic region.

19. The system of claim 15, wherein the central location of the geographic region is a city center location.

20. The system of claim 15, wherein the one or more processors further perform operations comprising:

for each of the candidate search results, combining the location relevance score for the candidate search result with another type of relevance score for the candidate search result prior to ranking the plurality of candidate search results.

21. The system of claim 15, wherein calculating a polygon distance score for candidate search results having geographic locations inside the bounding polygon of the geographic region comprises employing a function wherein:

the polygon distance score increases as a function of increasing distance between the geographic location of the candidate search result and the edge of the bounding polygon; and the polygon distance score is subjected to a lower score limit, and wherein calculating a polygon distance score for candidate search results having geographic locations outside the bounding polygon of the geographic region comprises employing a function wherein:

the polygon distance score decreases as a function of increasing distance between the geographic location of the candidate search result and the edge of the bounding polygon; and the polygon distance score is subjected to an upper score limit.

* * * * *